United States Patent
Sawamoto et al.

(10) Patent No.: US 7,266,453 B2
(45) Date of Patent: Sep. 4, 2007

(54) VEHICULAR OBJECT DETECTION SYSTEM, TRACKING CONTROL SYSTEM, AND VEHICLE CONTROL SYSTEM

(75) Inventors: Kiichiro Sawamoto, Saitama (JP); Shigeru Inoue, Saitama (JP); Hiroshi Satoh, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 135 days.

(21) Appl. No.: 10/921,008

(22) Filed: Aug. 17, 2004

(65) Prior Publication Data
US 2005/0090950 A1 Apr. 28, 2005

(30) Foreign Application Priority Data
Aug. 22, 2003 (JP) .............................. 2003-298651
Oct. 10, 2003 (JP) .............................. 2003-351892

(51) Int. Cl.
*G06F 17/10* (2006.01)
(52) U.S. Cl. ....................... 701/300; 701/301; 340/435; 340/436
(58) Field of Classification Search ................ 701/200, 701/201, 207, 214, 300, 301; 340/990, 995.1, 340/425.5, 435, 436, 438
See application file for complete search history.

(56) References Cited
U.S. PATENT DOCUMENTS 5,890,085 A * 3/1999 Corrado et al. ............... 701/47
6,087,975 A * 7/2000 Sugimoto et al. ............. 342/70
6,838,338 B2 * 1/2005 Sandhu et al. ............... 438/253
6,853,738 B1 * 2/2005 Nishigaki et al. ........... 382/106
2003/0236605 A1 * 12/2003 Takahashi .................... 701/45
2004/0049341 A1 * 3/2004 Fujiwara ..................... 701/210

FOREIGN PATENT DOCUMENTS
JP 5-174296 7/1993

\* cited by examiner

*Primary Examiner*—Gertrude A. Jeanglaude
(74) *Attorney, Agent, or Firm*—O'Melveny & Myers LLP

(57) ABSTRACT

An ACC system includes a radar device for detecting an object in front of a subject vehicle, locus estimator for estimating a travel locus of the subject vehicle, detection area setter for setting a predetermined detection area in front of the subject vehicle based on the travel locus of the subject vehicle, obstacle extractor for extracting a preceding vehicle based on a detection result of the radar device and the detection area, and acceleration/deceleration intention detector for detecting an intention of an occupant to accelerate or decelerate. Since the detection area setter increases the detection area for an obstacle when the acceleration/deceleration intention detector detects an intention of the occupant to decelerate, it is possible to reliably detect a cutting-in vehicle that cuts in front of the subject vehicle and to prevent the subject vehicle from coming into contact with the cutting-in vehicle, thus preventing the driver from feeling uncomfortable and ensuring reliable operation of the ACC system.

20 Claims, 11 Drawing Sheets

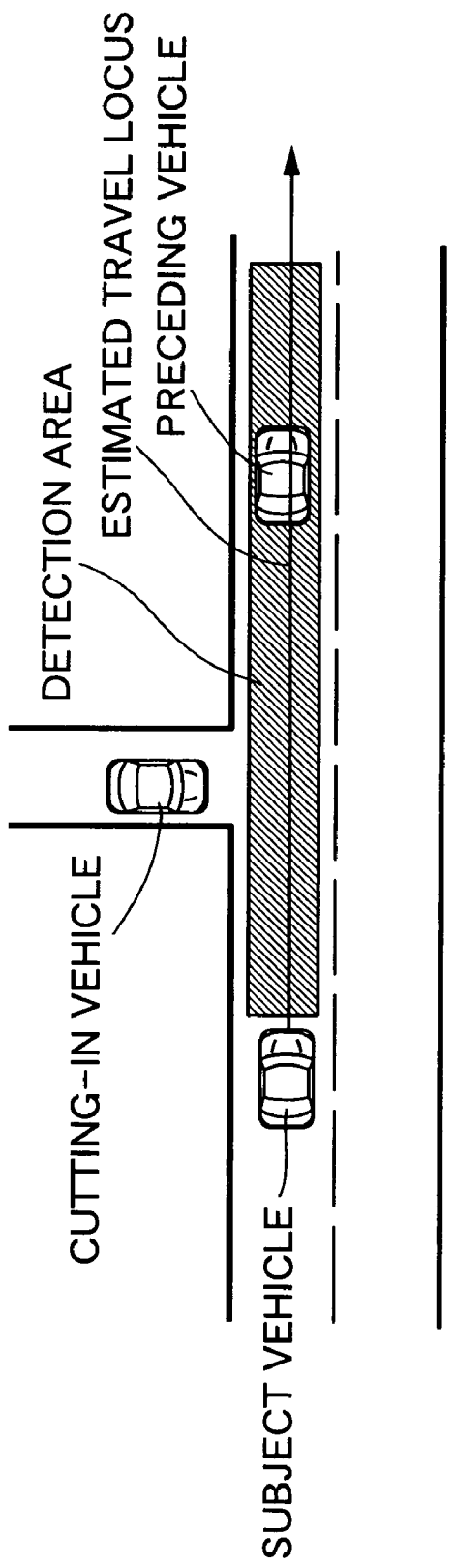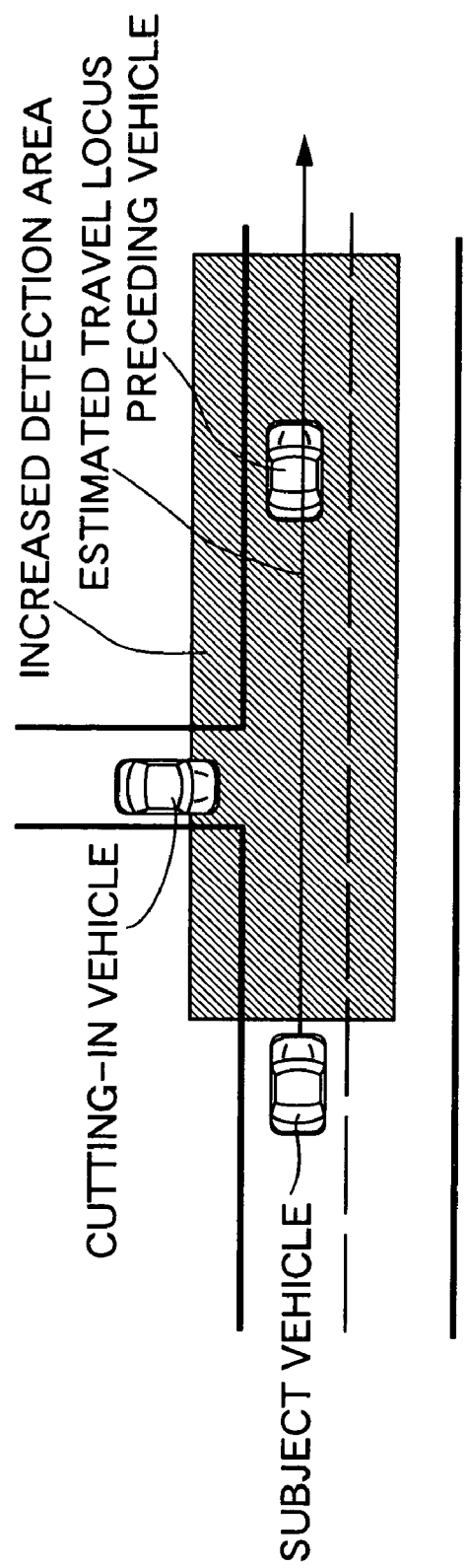

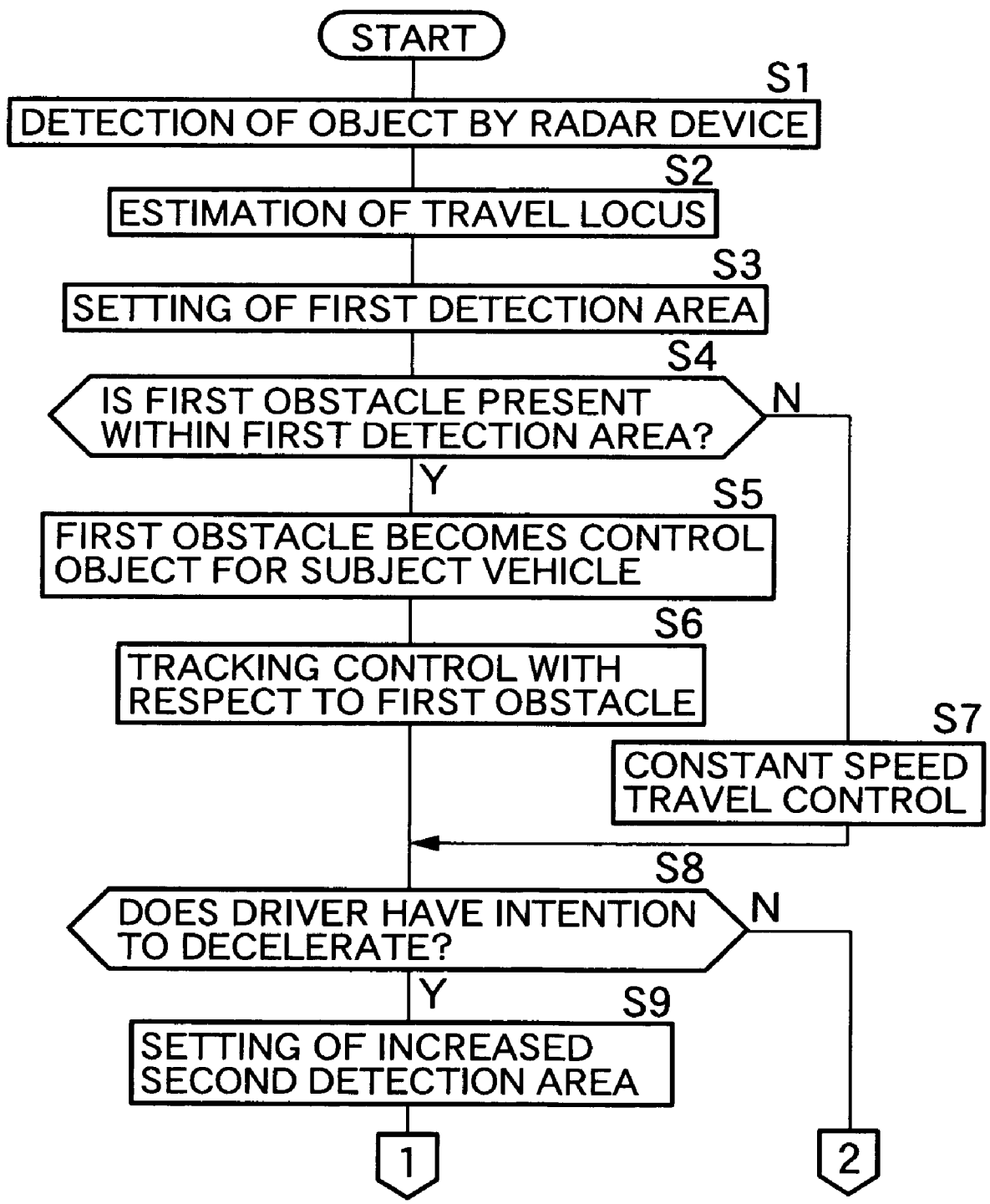

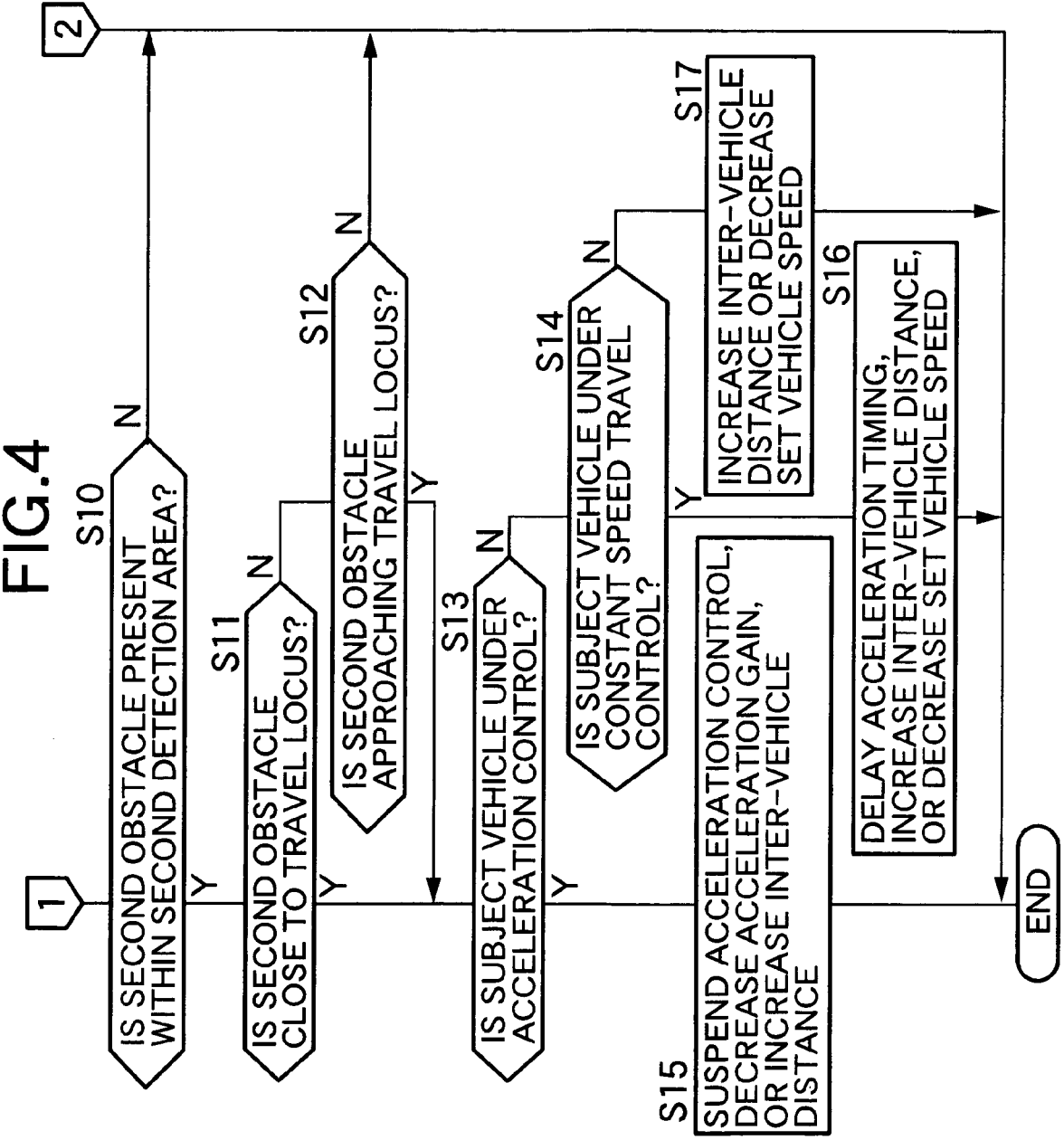

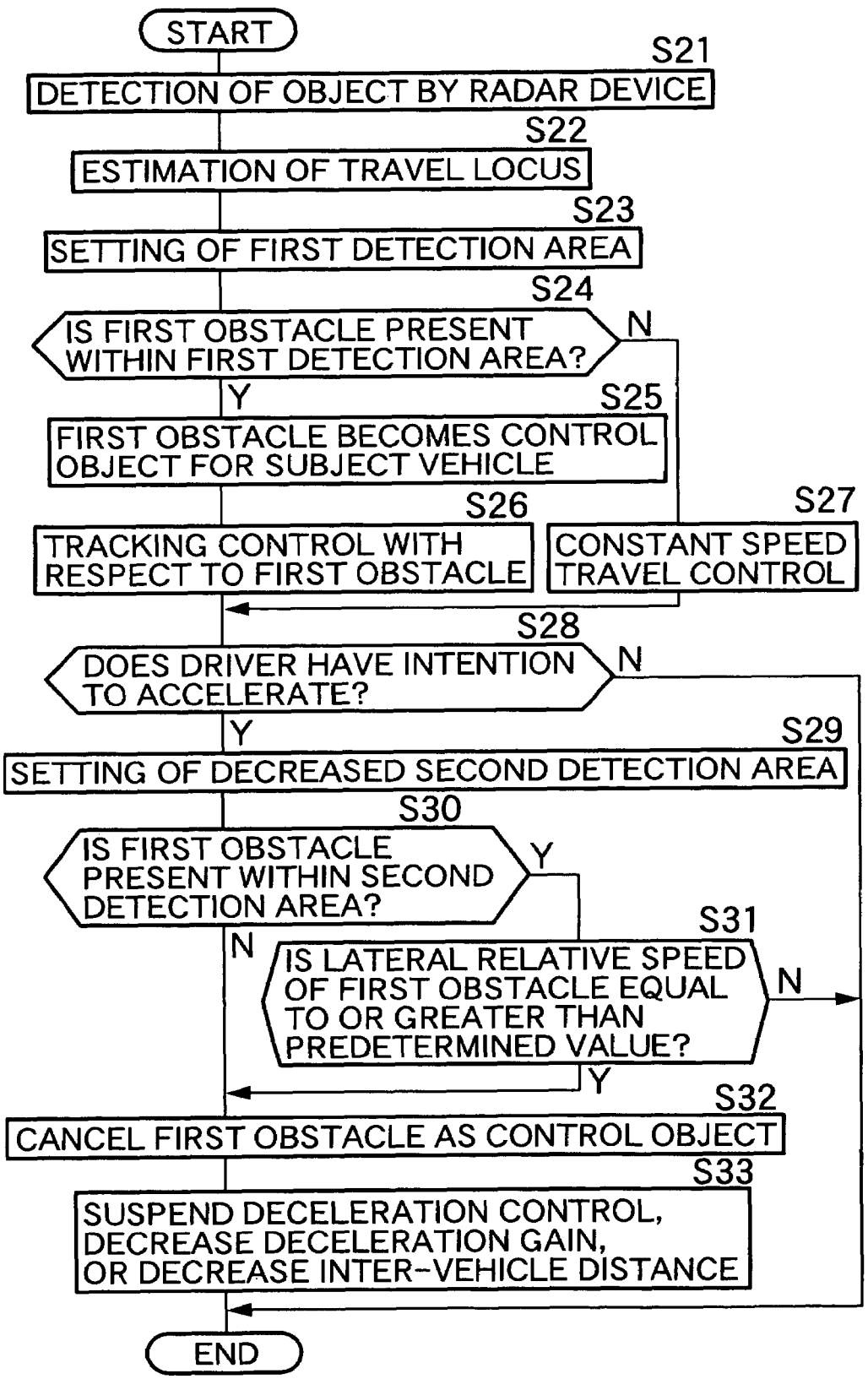

VEHICULAR OBJECT DETECTION SYSTEM, TRACKING CONTROL SYSTEM, AND VEHICLE CONTROL SYSTEM

BACKGROUND OF THE INVENTION

1. Field of the Invention

The present invention relates to a vehicular object detection system mounted in a vehicle that detects an object in front of the vehicle, and a tracking control system employing the vehicular object detection system.

The present invention also relates to a vehicle control system that includes an object detection system for detecting an object in front of a subject vehicle, a locus estimation system for estimating a travel locus of the subject vehicle, and a control object determination system for determining a control object with respect to which the travel of the subject vehicle is controlled, based on outputs from the object detection system and the locus estimation system and on predetermined control object determination.

2. Description of Related Art

Japanese Patent Application Laid-open No. 5-174296 discloses an inter-vehicle distance detection and warning system in which the distance between a subject vehicle and a preceding vehicle is detected by a radar device and a warning is issued to a driver when the inter-vehicle distance becomes a predetermined value or less, to thereby prevent collision. A detection area of the radar device is changed according to change in the speed of the subject vehicle.

In the above-mentioned conventional arrangement, the detection area of the radar device is changed according to the vehicle speed. But, even when the vehicle speed is constant, the possibility of collision differs between a case where the driver has noticed the inter-vehicle distance decreasing and has the intention of decelerating and a case where the driver has no intention of decelerating. Therefore, it is not always appropriate to change the detection area according to the vehicle speed alone without taking into consideration the driver's intention.

Further, the detection area is generally set to be along the travel locus of the subject vehicle and substantially as wide as a lane so that the radar device detects a preceding vehicle. However, when there is an intersection, etc. in front of the vehicle, the driver must also pay attention to any vehicles cutting in from the side into the travel locus of the subject vehicle. Therefore, in detection of a preceding vehicle based on a narrow detection area substantially having the lane width, there might be a gap between the detection and the driver's consciousness. Widening of the detection area is undesirable in solving this problem, because a vehicle in the opposite lane might be erroneously detected, or the data processing load of the object detection system might increase.

As shown in FIG. 2A and FIG. 2B, when a vehicle cuts in between the subject vehicle and the preceding vehicle at an intersection, the driver generally drives the subject vehicle while paying attention not only to the preceding vehicle but also to the vehicle that cuts in. That is, if the driver recognizes in advance that a vehicle will cut in, the driver assumes that this vehicle will cut in between the subject vehicle and the preceding vehicle, and eases up on the accelerator pedal or prepares to press on the brake pedal in order to avoid moving closer to the preceding vehicle.

On the other hand, when constant inter-vehicle distance control is carried out, in which the distance between a subject vehicle and a preceding vehicle is maintained to be constant, the detection area of the radar device is set to be relatively narrow as shown in FIG. 2A. The radar device detects the preceding vehicle but often does not detect a vehicle that is cutting in. In such a case, the radar device does not detect the cutting-in vehicle although the driver is aware of the cutting-in vehicle, and therefore the constant inter-vehicle distance control is continued without taking into consideration the cutting-in vehicle. This can cause the driver to feel uncomfortable.

Alternatively, if the detection area of the radar device is unnecessarily increased as shown in FIG. 2B, a cutting-in vehicle that will not interfere with travel of the subject vehicle is detected as a control object. This causes sudden automatic braking to be executed during constant inter-vehicle distance control, which may again cause the driver to feel uncomfortable.

SUMMARY OF THE INVENTION

The present invention has been achieved under the above-mentioned circumstances, and a first object thereof is to reliably detect an obstacle by appropriately setting the detection area of the object detection system. Further, a second object of the present invention is to perform vehicle control without an occupant feeling uncomfortable by appropriately determining a control object among objects detected by the object detection system.

In accordance with a first aspect of the present invention, there is proposed a vehicular object detection system comprising: an object detector for detecting an object in front of a subject vehicle; a locus estimator for estimating a travel locus of the subject vehicle; a detection area setter for setting a predetermined detection area in front of the subject vehicle based on the travel locus of the subject vehicle; and an obstacle extractor for extracting an obstacle based on a detection result of the object detector and the detection area set by the detection area setter; wherein the vehicular object detection system further comprises an acceleration/deceleration intention detector for detecting an intention of an occupant to accelerate or decelerate; and wherein the detection area setter changes the predetermined detection area based on a detection result of the acceleration/deceleration intention detector.

With this arrangement, the object detection area that is set in front of the subject vehicle by the detection area setter based on the travel locus of the subject vehicle, is changed based on the intention of the occupant to accelerate or decelerate detected by the acceleration/deceleration intention detector. Therefore, it is possible to set an appropriate detection area according to the intention of the occupant to accelerate or decelerate, thus preventing the occupant from feeling uncomfortable.

In accordance with a second aspect of the present invention, in addition to the first aspect, the detection area setter increases the predetermined detection area when the acceleration/deceleration intention detector detects an intention of the occupant to decelerate. With this arrangement, the detection area setter increases the detection area when the acceleration/deceleration intention detector detects the intention of the occupant to decelerate. Therefore, the detection area is increased according to an increase in the amount of attention paid by the occupant to the situation in front of the subject vehicle, so that it is possible to obtain more information.

In accordance with a third aspect of the present invention, in addition to the first aspect, the detection area setter decreases the predetermined detection area when the acceleration/deceleration intention detector detects an intention of the occupant to accelerate. With this arrangement, the detection area setter decreases the detection area when the acceleration/deceleration intention detector detects the intention of the occupant to accelerate. Therefore, it is possible to quickly exclude a control object for which the occupant has determined that no detection is required, thus preventing unnecessary vehicle control from being carried out and preventing the occupant from feeling uncomfortable.

In accordance with a fourth aspect of the present invention, in addition to any one of the first to the third aspects, the acceleration/deceleration intention detector detects an intention of the occupant to accelerate or decelerate based on at least one of operation of a brake pedal by the occupant, operation of an accelerator pedal by the occupant, operation of a switch by the occupant, and the voice of the occupant. With this arrangement, the acceleration/deceleration intention detector detects the intention of the occupant to accelerate or decelerate based on at least one of operation of the brake pedal, operation of the accelerator pedal, operation of the switch, and the voice of the occupant, whereby the detection can be carried out easily and reliably.

In accordance with a fifth aspect of the present invention, there is proposed a vehicular object detection system comprising: an object detector for detecting an object in front of a subject vehicle; a locus estimator for estimating a travel locus of the subject vehicle; a detection area setter for setting a predetermined detection area in front of the subject vehicle based on the travel locus of the subject vehicle; and an obstacle extractor for extracting an obstacle based on a detection result of the object detector and the detection area set by the detection area setter; wherein the vehicular object detection system further comprises an acceleration/deceleration detector for detecting an acceleration or a deceleration; and wherein the detection area setter changes the predetermined detection area based on a detection result of the acceleration/deceleration detector. With this arrangement, the detection area setter changes, based on the acceleration or deceleration of the subject vehicle detected by the acceleration/deceleration detector, the object detection area set in front of the subject vehicle based on the travel locus of the subject vehicle. Therefore, an appropriate detection area can be set according to the probability of contact with an obstacle, thus preventing the occupant from feeling uncomfortable.

In accordance with a sixth aspect of the present invention, in addition to the fifth aspect, the detection area setter increases the predetermined detection area when the acceleration/deceleration detector detects a deceleration. With this arrangement, since the detection area setter increases the predetermined detection area when the acceleration/deceleration detector detects a deceleration, the detection area is increased according to an increase in the probability of contact with an obstacle. It is therefore possible to obtain more information.

In accordance with a seventh aspect of the present invention, in addition to the fifth aspect, the detection area setter decreases the predetermined detection area when the acceleration/deceleration detector detects an acceleration. With this arrangement, since the detection area setter decreases the detection area when the acceleration/deceleration detector detects an acceleration, the detection area is decreased according to a decrease in the probability of contact with an obstacle. It is therefore possible to prevent unnecessary vehicle control from being carried out and prevent the occupant from feeling comfortable.

In accordance with an eighth aspect of the present invention, there is proposed a tracking control system comprising: the vehicular object detection system as described above; and, vehicle controller for making the subject vehicle track a preceding vehicle extracted by the obstacle extractor; wherein, the detection area setter changes at least one of a detection area from the subject vehicle to the preceding vehicle and a detection area from the preceding vehicle to the maximum detectable distance of the detector. With this arrangement, when the vehicle controller controls the subject vehicle to follow the preceding vehicle extracted by the obstacle extractor, the detection area setter changes at least one of the detection area from the subject vehicle to the preceding vehicle and the detection area from the preceding vehicle to the maximum detectable distance of the object detector. Therefore, it is possible to collect more information about an object in a desired detection area while reducing the load of the object detector by setting the detection area to be the minimum necessary, thereby carrying out stable tracking.

In accordance with a ninth aspect of the present invention, there is proposed a tracking control system comprising: the vehicular object detection system as described above; and vehicle controller for making the subject vehicle track a preceding vehicle extracted by the obstacle extractor; wherein the detection area setter is able to individually set detection areas on the left-side and right-side of the travel locus of the subject vehicle and changes, among the left-side and right-side detection areas, only the detection area that is in a direction of travel of the preceding vehicle extracted by the obstacle extractor.

With this arrangement, when the vehicle controller controls the subject vehicle to follow the preceding vehicle extracted by the obstacle extractor, since the detection area setter changes, among the detection areas on the left-side and the right-side of the travel locus of the subject vehicle, only the detection area that is in the direction of travel of the preceding vehicle is extracted by the obstacle extractor. The detection area on the opposite side to the direction of travel of the preceding vehicle is not changed. It is therefore possible to carry out detection of an oncoming vehicle on the left-hand (or right-hand) side when the preceding vehicle turns right (or left), and detection of a vehicle that is parked on the right-hand (or left-hand) side of the road when the preceding vehicle turns left (or right).

In accordance with a tenth aspect of the present invention, there is proposed a vehicle control system comprising: an object detector for detecting an object in front of a subject vehicle; a locus estimator for estimating a travel locus of the subject vehicle; and a control object determinator for determining a control object with respect to which the travel of the subject vehicle is controlled, based on outputs of the object detector and the locus estimator and on predetermined control object determination conditions; wherein the vehicle control system further comprises an acceleration/deceleration intention detector for detecting an intention of an occupant to accelerate or decelerate; and wherein the control object determinator changes the control object determination conditions based on a detection result of the acceleration/deceleration intention detector.

With this arrangement, when the control object determinator determines, based on the outputs of the object detector and the locus estimator and on the predetermined control object determination conditions, the control object with respect to which the travel of the subject vehicle is controlled, the control object determination conditions are changed based on the intention of the occupant to accelerate or decelerate as detected by the acceleration/deceleration intention detector. Therefore, it is possible to determine an appropriate control object while taking into consideration the intention of the occupant to accelerate or decelerate, thus preventing inappropriate vehicle control from being carried out and preventing the occupant from feeling uncomfortable.

In accordance with an eleventh aspect of the present invention, in addition to the tenth aspect, the vehicle control system further comprises a target control value determinator for determining a target control value based on an output of the control object determinator, and a vehicle controller for carrying out travel control of the subject vehicle based on an output of the target control value determinator, and the control object determinator changes the control object determination conditions so that a detected object is more easily determined to be the control object when the acceleration/deceleration intention detector detects an intention of the occupant to decelerate while the vehicle controller is carrying out acceleration control or constant speed travel control.

With this arrangement, in the travel control of the subject vehicle carried out by the vehicle controller based on the target control value determined by the target control value determinator, when the acceleration/deceleration intention detector detects the intention of the occupant to decelerate while the vehicle controller is carrying out acceleration control or constant speed travel control, the control object determination conditions are changed so that it is more easily determined that the detected object is the control object. Therefore, it is possible to carry out more reliable vehicle control by increasing the range in which an object can become the control object when the occupant has a concern about the situation in front of the subject vehicle.

In accordance with a twelfth aspect of the present invention, in addition to the tenth aspect, the vehicle control system further comprises a target control value determinator for determining a target control value based on an output of the control object determinator, and a vehicle controller for carrying out travel control of the subject vehicle based on an output of the target control value determinator, and the control object determinator changes the control object determination conditions so that a detected object is less easily determined to be the control object when the acceleration/deceleration intention detector detects an intention of the occupant to accelerate while the vehicle controller is carrying out deceleration control or constant speed travel control.

With this arrangement, in the travel control of the subject vehicle carried out by the vehicle controller based on the target control value determined by the target control value determinator, when the acceleration/deceleration intention detector detects the intention of the occupant to accelerate while the vehicle controller is carrying out deceleration control or constant speed travel control, the control object determination conditions are changed so that it is less easily determined that the detected object is the control object. Therefore, it is possible to prevent unnecessary vehicle control from being carried out, by decreasing the range in which an object can become the control object when the occupant does not have a concern about the situation in front of the subject vehicle.

In accordance with a thirteenth aspect of the present invention, in addition to the tenth aspect, the control object determinator changes, among the control object determination conditions, a first distance evaluation threshold value based on a detection result of the acceleration/deceleration intention detector, and when the distance between an object detected by the object detector and a travel locus of the subject vehicle estimated by the locus estimator is equal to or less than the first distance evaluation threshold value, the detected object becomes the control object.

With this arrangement, the control object determinator changes the first distance evaluation threshold value based on the detection result of the acceleration/deceleration intention detector and determines that the object is the control object when the distance between the object and the travel locus of the subject vehicle is equal to or less than the first distance evaluation threshold value. Therefore, it is possible to determine the control object appropriately according to the level of probability of the subject vehicle interfering with the object.

In accordance with a fourteenth aspect of the present invention, in addition to the tenth aspect, the control object determinator changes, among the control object determination conditions, a second distance evaluation threshold value based on a detection result of the acceleration/deceleration intention detector. When the distance between an estimated position after a predetermined period of time of an object detected by the object detector and an estimated position after the predetermined period of time of the subject vehicle is equal to or less than the second distance evaluation threshold value, the detected object becomes the control object.

With this arrangement, the control object determinator changes the second distance evaluation threshold value based on the detection result of the acceleration/deceleration intention detector, and the object becomes the control object when the distance between the estimated position of the object and the estimated position of the subject vehicle after the predetermined period of time is equal to or less than the second distance evaluation threshold value. Therefore, it is possible to determine the control object appropriately according to the level of probability of the subject vehicle interfering with the object.

In accordance with a fifteenth aspect of the present invention, in addition to the tenth aspect, the control object determinator changes, among the control object determination conditions, a speed evaluation threshold value based on a detection result of the acceleration/deceleration intention detector. When the lateral speed of movement, relative to the subject vehicle, of an object detected by the object detector is equal to or greater than the speed evaluation threshold value and the object is approaching the subject vehicle, the detected object becomes the control object.

With this arrangement, the control object determinator changes the speed evaluation threshold value based on the detection result of the acceleration/deceleration intention detector. When the lateral speed of movement of the object relative to the subject vehicle is equal to or greater than the speed evaluation threshold value and the object is approaching the subject vehicle, the object becomes the control object. Therefore, it is possible to determine the control object appropriately according to the level of probability of the subject vehicle interfering with the object.

In accordance with a sixteenth aspect of the present invention, in addition to any one of the tenth to the fifteenth aspects, there is proposed a vehicle control system wherein the acceleration/deceleration intention detector detects an intention of the occupant to accelerate or decelerate based on at least one of operation of a brake pedal by the occupant, operation of an accelerator pedal by the occupant, operation of a switch by the occupant, and voice of the occupant. With this arrangement, since the acceleration/deceleration intention detector detects the intention of the occupant to accelerate or decelerate based on at least one of operation of the brake pedal, operation of the accelerator pedal, operation of the switch, and the voice of the occupant, the detection can be carried out easily and reliably.

In accordance with a seventeenth aspect of the present invention, there is proposed a vehicle control system comprising: an object detector for detecting an object in front of a subject vehicle; a locus estimator for estimating a travel locus of the subject vehicle; and a control object determinator for determining a control object based on outputs of the object detector and the locus estimator and on predetermined control object determination conditions; wherein the vehicle control system further comprises acceleration/deceleration detector for detecting an acceleration or a deceleration; and wherein the control object determinator changes the control object determination conditions based on a detection result of the acceleration/deceleration detector.

With this arrangement, when the control object determinator determines the control object with respect to which the travel of the subject vehicle is controlled, based on the outputs of the object detector and the locus estimator and on the predetermined control object determination conditions, the control object determination conditions are changed based on an acceleration or deceleration detected by the acceleration/deceleration detector. Therefore, it is possible to determine an appropriate control object while taking into consideration the acceleration or deceleration of the subject vehicle, thus preventing inappropriate vehicle control from being carried out and preventing the occupant from feeling uncomfortable.

In accordance with an eighteenth aspect of the present invention, in addition to the seventeenth aspect, the vehicle control system further comprises target control value determinator for determining a target control value based on an output of the control object determinator, and a vehicle controller for carrying out travel control of the subject vehicle based on an output of the target control value determinator, and the control object determinator changes the control object determination conditions so that a detected object is more easily determined to be the control object when the acceleration/deceleration detector detects a deceleration equal to or great than a predetermined value while the vehicle controller is carrying out acceleration control or constant speed travel control.

With this arrangement, in the travel control of the subject vehicle carried out by the vehicle controller based on the target control value determined by the target control value determinator, when the acceleration/deceleration detector detects the deceleration of the subject vehicle while the vehicle controller is carrying out acceleration control or constant speed travel control, the control object determination conditions are changed so that it is more easily determined that the detected object is the control object. Therefore, it is possible to carry out more reliable vehicle control by increasing the range in which an object can become the control object when the occupant has a concern about the situation in front of the subject vehicle.

In accordance with a nineteenth aspect of the present invention, in addition to the seventeenth aspect, the vehicle control system further comprises a target control value determinator for determining a target control value based on an output of the control object determinator, and a vehicle controller for carrying out travel control of the subject vehicle based on an output of the target control value determinator. The control object determinator changes the control object determination conditions so that a detected object is less easily determined to be the control object when the acceleration/deceleration detector detects an acceleration equal to or greater than a predetermined value while the vehicle controller is carrying out deceleration control or constant speed travel control.

With this arrangement, in the travel control of the subject vehicle carried out by the vehicle controller based on the target control value determined by the target control value determinator, when the acceleration/deceleration detector detects the acceleration of the subject vehicle while the vehicle controller is carrying out deceleration control or constant speed travel control, the control object determination conditions are changed so that it is less easily determined that the detected object is the control object. Therefore, it is possible to prevent unnecessary vehicle control from being carried out by decreasing the range in which an object can become the control object when the occupant does not have a concern about the situation in front of the subject vehicle.

In accordance with a twentieth aspect of the present invention, in addition to any one of the seventeenth to the nineteenth aspects, the control object determinator changes, among the control object determination conditions, a first distance evaluation threshold value based on a detection result of the acceleration/deceleration detector. When the distance between an object detected by the object detector and a travel locus of the subject vehicle estimated by the locus estimator is equal to or less than the first distance evaluation threshold value, the detected object becomes the control object.

With this arrangement, the control object determinator changes the first distance evaluation threshold value based on the detection result of the acceleration/deceleration detector and the object becomes the control object when the distance between the object and the travel locus of the subject vehicle is equal to or less than the first distance evaluation threshold value. Therefore, it is possible to determine the control object appropriately according to the level of probability of the subject vehicle interfering with the object.

In accordance with a twenty-first aspect of the present invention, in addition to any one of the seventeenth to the nineteenth aspects, the control object determinator changes, among the control object determination conditions, a second distance evaluation threshold value based on a detection result of the acceleration/deceleration detector. When the distance between an estimated position after a predetermined period of time of an object detected by the object detector and an estimated position after the predetermined period of time of the subject vehicle is equal to or less than the second distance evaluation threshold value, the detected object becomes the control object.

With this arrangement, the control object determinator changes the second distance evaluation threshold value based on the detection result of the acceleration/deceleration detector, and the object becomes the control object when the distance between the estimated position of the object and the estimated position of the subject vehicle after the predetermined period of time is equal to or less than the second distance evaluation threshold value. Therefore, it is possible to determine the control object appropriately according to the level of probability of the subject vehicle interfering with the object.

In accordance with a twenty-second aspect of the present invention, in addition to any one of the seventeenth to the nineteenth aspects, the control object determinator changes, among the control object determination conditions, a speed evaluation threshold value based on a detection result of the acceleration/deceleration detector. When the lateral speed of movement, relative to the subject vehicle, of an object detected by the object detector is equal to or greater than the speed evaluation threshold value and the object is approaching the subject vehicle, the detected object becomes the control object.

With this arrangement, the control object determinator changes the speed evaluation threshold value based on the detection result of the acceleration/deceleration detector. When the lateral speed of movement, relative to the subject vehicle, of the object is equal to or greater than the speed evaluation threshold value and the object is approaching the subject vehicle, the object becomes the control object. Therefore, it is possible to determine the control object appropriately according to the level of probability of the subject vehicle interfering with the object.

The above-mentioned objects, other objects, characteristics, and advantages of the present invention will become apparent from preferred embodiments that will be described in detail below with reference to the attached drawings.

BRIEF DESCRIPTION OF THE DRAWINGS

FIG. 2A and FIG. 2B are explanatory diagrams for a detection area.

FIG. 3 and FIG. 4 are flowcharts for explaining the operation when a driver has an intention to decelerate.

FIG. 5 is a flowchart for explaining the operation when the driver has an intention to accelerate.

DETAILED DESCRIPTION OF THE PREFERRED EMBODIMENT

Figure 1:
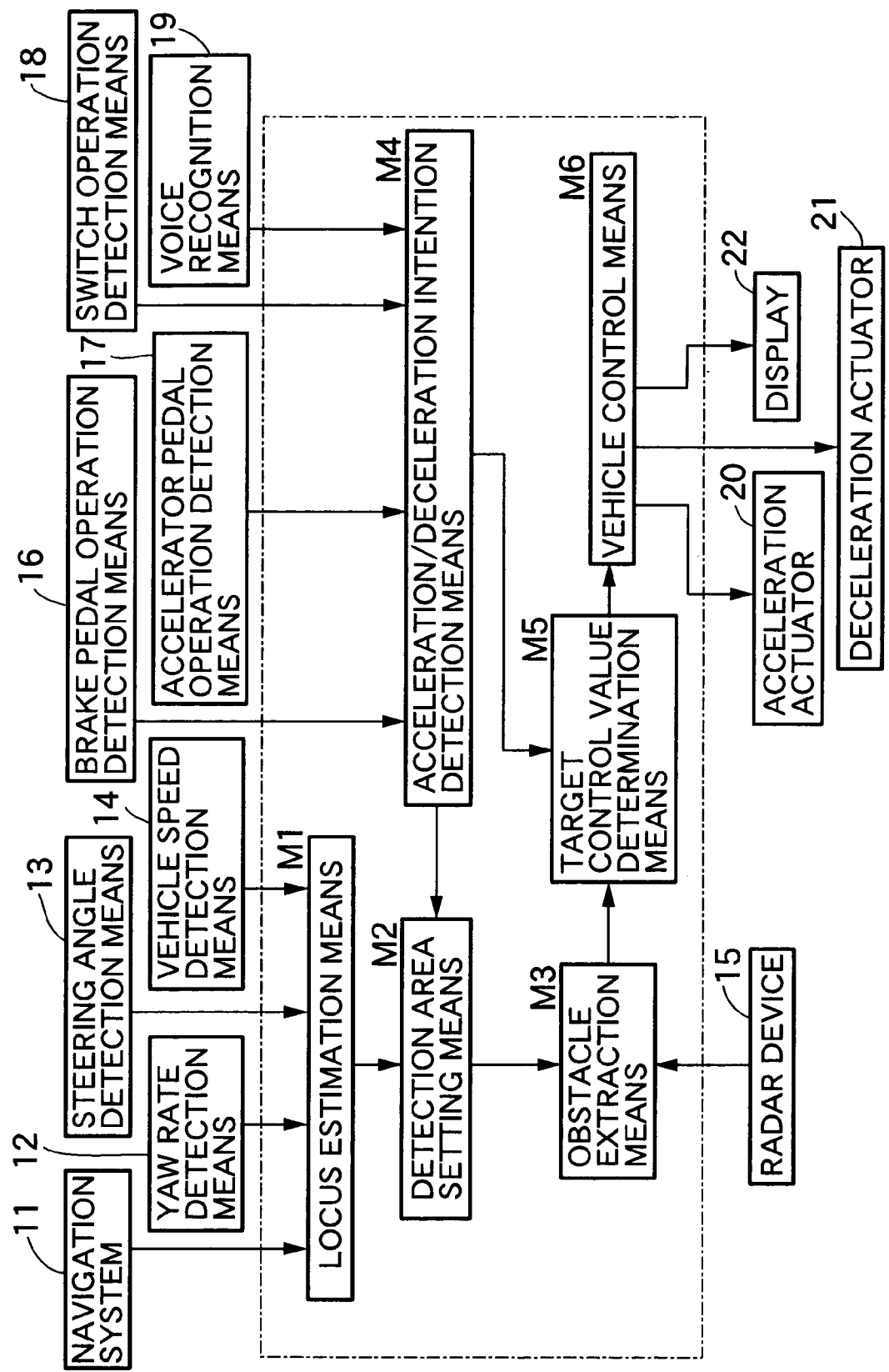
FIG. 1 is a block diagram of a control system for an ACC system according to a first embodiment of the present invention.

A first embodiment of the present invention will be described below with reference to FIG. 1 to FIG. 5. As shown in FIG. 1, an ACC (Adaptive Cruise Control) system maintains a preset inter-vehicle distance when there is a preceding vehicle, thus tracking the preceding vehicle, and maintains a preset vehicle speed when there is no preceding vehicle, thus keeping the speed constant. The ACC system includes locus estimator M1, detection area setter M2, obstacle extractor M3, acceleration/deceleration intention detector M4, target control value determinator M5, and vehicle controller M6. Connected to the locus estimator M1 are a navigation system 11, yaw rate detector 12, steering angle detector 13, and vehicle speed detector 14. Connected to the obstacle extractor M3 is a radar device 15. Connected to the acceleration/deceleration intention detector M4 are brake pedal operation detector 16, accelerator pedal operation detector 17, switch operation detector 18, and voice recognition device 19. Connected to the vehicle controller M6 are an acceleration actuator 20, a deceleration actuator 21, and a display 22.

The locus estimator M1 estimates a future travel locus of a subject vehicle based on road information stored in the navigation system 11, a yaw rate detected by the yaw rate detector 12, a steering angle detected by the steering angle detector 13, and a vehicle speed detected by the vehicle speed detector 14.

The acceleration/deceleration intention detector M4 determines whether a driver has an intention to accelerate or decelerate the subject vehicle. That is, if the brake pedal operation detector 16 detects an operation of pressing on a brake pedal, it is determined that the driver has an intention to decelerate. If the accelerator pedal operation detector 17 detects an operation of pressing on the accelerator pedal, it is determined that the driver has an intention to accelerate, and if an operation of returning the accelerator pedal is detected, it is determined that the driver has an intention to decelerate. Furthermore, if the switch operation detector 18 detects operation of a vehicle speed setting switch instructing a set vehicle speed for constant speed travel of the ACC system or operation of a resume switch modifying the set vehicle speed, it is determined that the driver has an intention to decelerate or accelerate. The voice recognition device 19 determines whether there is an intention to decelerate or accelerate from the content of occupants' conversation or the content of the driver's monologue.

As shown in FIG. 2A, the detection area setter M2 sets a detection area having as its center line the future travel locus of the subject vehicle estimated by the locus estimator M1, the detection area having a predetermined width along the center line. Normally, the width of the detection area is set to be the same as a lane width, but when the acceleration/deceleration intention detector M4 detects an intention of the driver to decelerate, as shown in FIG. 2B, the width of the detection area is increased. The increased detection area can be any width and, for example, can be an integral multiple of the lane width.

The radar device 15 transmits electromagnetic waves such as a laser beam or millimeter waves, and receives reflected waves of the electromagnetic waves from an object, thus detecting the direction of the object, the distance from the object, the speed relative to the object, etc. The obstacle extractor M3 extracts, from among objects detected by the radar device 15, an object that is present within the detection area as a preceding vehicle (obstacle), which becomes the control object.

The target control value determinator M5, with respect to the preceding vehicle extracted by the obstacle extractor M3 as the control object, determines a target vehicle speed, a target acceleration or deceleration, a target inter-vehicle distance, etc., which are parameters for making the subject vehicle track the preceding vehicle, and corrects the target vehicle speed, the target acceleration or deceleration, the target inter-vehicle distance, etc. according to the intention of the driver to accelerate or decelerate detected by the acceleration/deceleration intention detector M4.

The vehicle controller M6 drives the acceleration actuator 20 or the deceleration actuator 21 based on the target control value determined by the target control value determinator M5, carries out tracking control or constant speed travel control by opening or closing a throttle valve or operating a braking device, and informs the driver of the current vehicle control status by displaying it on the display 22.

The above-mentioned operation will be further described below with reference to flowcharts of FIG. 3 to FIG. 5. The flowcharts of FIG. 3 and FIG. 4 illustrate a case where the acceleration/deceleration intention detector M4 detects an intention of the driver to decelerate. Firstly, in Step S1, the radar device 15 detects an object. In Step S2, the locus estimator M1 estimates a travel locus of the subject vehicle. And, in Step S3, the detection area setter M2 sets a first detection area, that is, a detection area along the estimated travel locus having a width corresponding to a lane width. If in the subsequent Step S4 a first obstacle is present within the first detection area, then in Step S5 the obstacle extractor M3 sets the first obstacle as the control object, and in Step S6 the vehicle controller M6 controls the vehicle speed so that the subject vehicle tracks the first obstacle while maintaining a preset inter-vehicle distance. On the other hand, if in Step S4 there is no first obstacle within the first detection area, then in Step S7 the vehicle controller M6 controls the vehicle speed so that the subject vehicle travels at a preset constant vehicle speed.

If in the subsequent Step S8 the acceleration/deceleration intention detector M4 detects an intention of the driver to decelerate, then in Step S9 the detection area setter M2 sets a second detection area. As described with reference to FIG. 2A and FIG. 2B, the second detection area is set to have a width larger than that of the first detection area so that a cutting-in vehicle, etc. that cuts in from the side can be detected. If in the subsequent Step S10 a second obstacle is present in the second detection area, and in Step S11 the second obstacle is close to the travel locus of the subject vehicle, then in Steps S13 to S17, which will be described below, the nature of the vehicle control by the vehicle controller M6 is changed according to the urgency in order to prevent contact with the second obstacle. Alternatively, if in the Step S11 the second obstacle is far from the travel locus of the subject vehicle, and in Step S12 the second obstacle is approaching the travel locus of the subject vehicle, then Steps S13 to S17 will also be performed.

That is, if in Step S13 the subject vehicle is under acceleration control, then in Step S15 either the acceleration control of the subject vehicle is suspended, an acceleration gain is reduced, or the set inter-vehicle distance of the tracking control is increased. If in Step S14 the subject vehicle is under constant speed travel control, then in Step S16 either the timing at which acceleration of the subject vehicle is started is delayed, the set inter-vehicle distance of the tracking control is increased, or the set vehicle speed of the constant speed travel control is decreased. If in Step S14 the subject vehicle is under deceleration control, then in Step S17 the set inter-vehicle distance of the tracking control is increased, or the set vehicle speed of the constant speed travel control is decreased.

As described above, when the driver has a concern about the situation in front of the subject vehicle and has an intention to decelerate, the detection area for detecting an obstacle is increased. Therefore, it is possible to reliably detect a cutting-in vehicle, etc. that cuts in front of the subject vehicle, and to prevent contact with the cutting-in vehicle, thus preventing the driver from feeling uncomfortable and thereby enabling reliable operation of the ACC system. Moreover, since detection of the intention of the driver to decelerate is carried out based on operation of the brake pedal, operation of the accelerator pedal, operation of the switch, or the voice of the occupant, the detection can be carried out easily and reliably.

The flowchart of FIG. 5 shows a case where the acceleration/deceleration intention detector M4 detects an intention of the driver to accelerate. Firstly, in Step S21, the radar device 15 detects an object. In Step S22, the locus estimator M1 estimates a travel locus of the subject vehicle. And, in Step S23, the detection area setter M2 sets a first detection area, that is, a detection area along the estimated travel locus having a width corresponding to a normal lane width. If in the subsequent Step S24 a first obstacle is present within the first detection area, then in Step S25 the obstacle extractor M3 extracts the first obstacle as the control object, and in Step S26 the vehicle controller M6 controls the vehicle speed so that the subject vehicle tracks the first obstacle while maintaining a preset inter-vehicle distance. On the other hand, if in the Step S24 there is no first obstacle within the first detection area, then in Step S27 the vehicle controller M6 controls the vehicle speed so that the subject vehicle travels at a preset constant vehicle speed.

If in the subsequent Step S28 the acceleration/deceleration intention detector M4 detects an intention of the driver to accelerate, then in Step S29 the detection area setter M2 sets a second detection area narrower than the first detection area. If in Step S30 there is no first obstacle in the fresh second detection area, or if in the Step S30 the first obstacle is present in the second detection area and in Step S31 the lateral relative speed of the first obstacle is equal to or greater than a predetermined value, that is, if the first obstacle is moving away from the subject vehicle in the lateral direction at a high speed, then in Step S32 the tracking control with respect to the first obstacle is canceled and constant speed travel control is continued. In Step S33, deceleration control of the subject vehicle is suspended, deceleration gain is reduced, or the set inter-vehicle distance for tracking control is decreased. If in Step S31 the lateral relative speed of the first obstacle is less than the predetermined value, the tracking control of Step S26 is continued unchanged.

As described above, when the driver confirms that it is safe in front of the subject vehicle and has an intention to accelerate, the detection area for detecting an obstacle is reduced, and therefore a preceding vehicle that turns left or right and moves away from the travel locus of the subject vehicle can be quickly excluded from being a control object, thus preventing unnecessary tracking control from being carried out and preventing the driver from feeling uncomfortable. Moreover, since detection of an intention of the driver to accelerate is carried out based on operation of the brake pedal, operation of the accelerator pedal, operation of the switch, or the voice of an occupant, the detection can be carried out easily and reliably.

Figure 6:
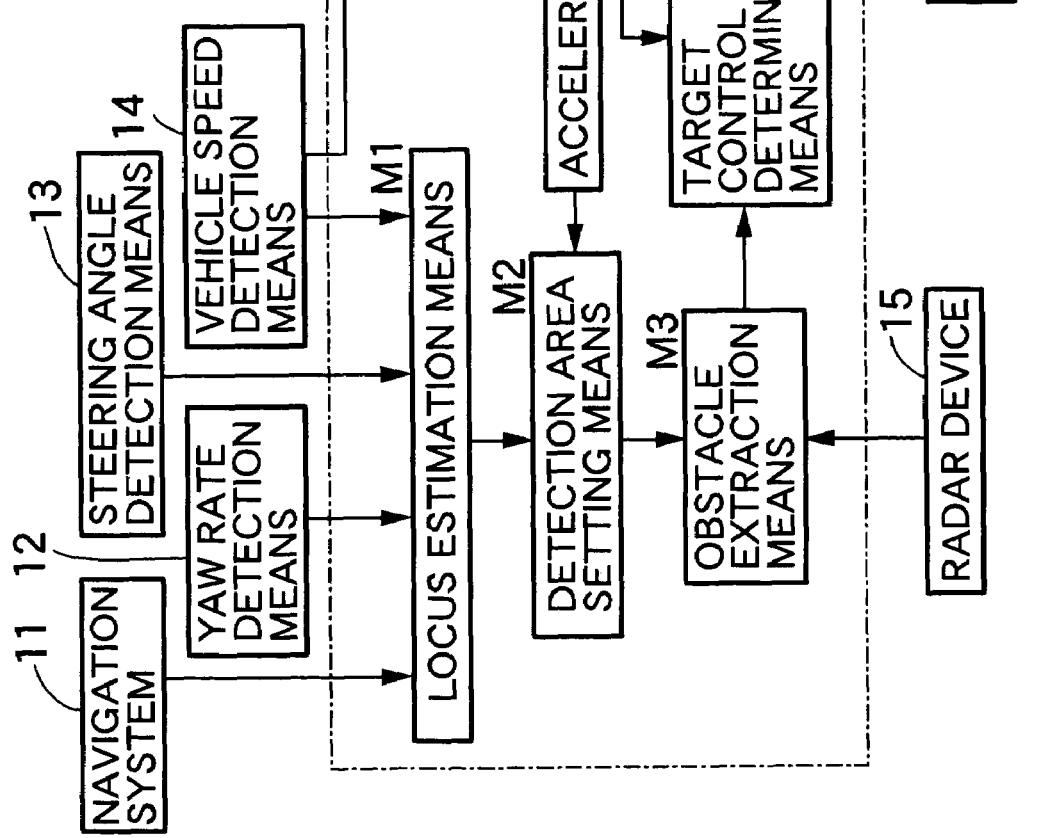
FIG. 6 is a block diagram of a control system for an ACC system according to a second embodiment of the present invention.

A second embodiment of the present invention will be described below with reference to FIG. 6. The second embodiment includes acceleration/deceleration detector M7 instead of the acceleration/deceleration intention detector M4 of the first embodiment. The acceleration/deceleration detector M7 detects an acceleration or a deceleration of a vehicle by differentiating, with respect to time, a vehicle speed input from the vehicle speed detector 14.

In the first embodiment, the detection area is increased or decreased and the nature of the control of the ACC system is changed based on the intention of the driver to decelerate or accelerate. In contrast, in the second embodiment, the detection area is increased or decreased and nature of the control of the ACC system is changed based on an actual deceleration or acceleration of the vehicle. Since an acceleration or a deceleration of the vehicle detected by the acceleration/deceleration detector M7 not only reflects an intention of the driver to accelerate or decelerate, but also reflects automatic acceleration or deceleration by the vehicle controller M6, which does not depend on the intention of the driver, it is possible to ensure more accurate operation of the ACC system.

Figure 7:
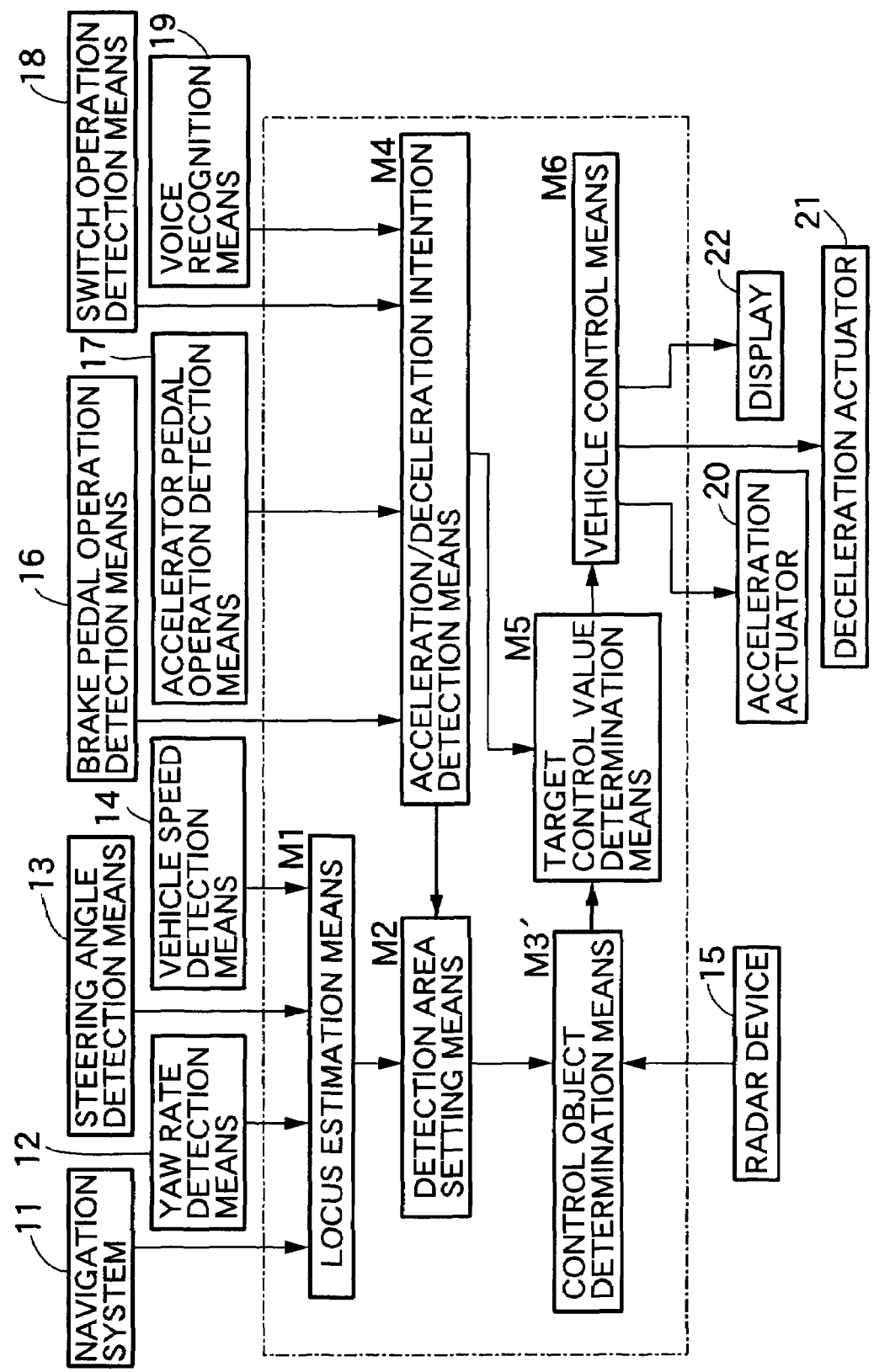
FIG. 7 is a block diagram of a control system for an ACC system according to a third embodiment of the present invention.

A third embodiment of the present invention will be described below with reference to FIG. 7 to FIG. 10. As shown in FIG. 7, an ACC (Adaptive Cruise Control) system maintains a preset inter-vehicle distance when there is a preceding vehicle, thus tracking the preceding vehicle, and maintains a preset vehicle speed when there is no preceding vehicle, thus keeping the speed constant. The ACC system includes locus estimator M1, detection area setter M2, control object determinator M3', acceleration/deceleration intention detector M4, target control value determinator M5, and vehicle controller M6. Connected to the locus estimator M1 are a navigation system 11, yaw rate detector 12, steering angle detector 13, and vehicle speed detector 14. Connected to the control object determinator M3' is a radar device 15. Connected to the acceleration/deceleration intention detector M4 are brake pedal operation detector 16, accelerator pedal operation detector 17, switch operation detector 18, and voice recognition device 19. Connected to the vehicle controller M6 are an acceleration actuator 20, a deceleration actuator 21, and a display 22.

The locus estimator M1 estimates a future travel locus of a subject vehicle based on road information stored in the navigation system 11, a yaw rate detected by the yaw rate detector 12, a steering angle detected by the steering angle detector 13, and a vehicle speed detected by the vehicle speed detector 14.

The detection area setter M2 sets a detection area having as its center line the future travel locus of the subject vehicle estimated by the locus estimator M1, the detection area having a predetermined width along the center line.

The acceleration/deceleration intention detector M4 determines whether a driver has an intention to accelerate or decelerate the subject vehicle. That is, if the brake pedal operation detector 16 detects an operation of pressing on a brake pedal, it is determined that the driver has an intention to decelerate. If the accelerator pedal operation detector 17 detects an operation of pressing on the accelerator pedal, it is determined that the driver has an intention to accelerate, and if an operation of returning the accelerator pedal is detected, it is determined that the driver has an intention to decelerate. Furthermore, if the switch operation detector 18 detects operation of a vehicle speed setting switch instructing a set vehicle speed for constant speed travel of the ACC system or operation of a resume switch modifying the set vehicle speed, it is determined that the driver has an intention to decelerate or accelerate. The voice recognition device 19 determines whether there is an intention to decelerate or accelerate from the content of occupants' conversation or the content of the driver's monologue. Switch operations detected by the switch operation detector 18 include operation of a touch panel.

The radar device 15 transmits electromagnetic waves such as a laser beam or millimeter waves, and receives reflected waves of the electromagnetic waves from an object, thus detecting the direction of the object, the distance from the object, the speed relative to the object, etc. The control object determinator M3' determines as the control object, from among objects detected by the radar device 15, an object such as a preceding vehicle that satisfies predetermined control object determination conditions. In this process, the control object determination conditions, which are criteria for determining which object is the control object, are changed according to an intention of the driver to accelerate or decelerate detected by the acceleration/deceleration intention detector M4.

The target control value determinator M5, with respect to the preceding vehicle determined as the control object by the control object determinator M3', determines a target vehicle speed, a target acceleration or deceleration, a target inter-vehicle distance, etc., which are parameters for making the subject vehicle track the preceding vehicle. The vehicle controller M6 drives the acceleration actuator 20 or the deceleration actuator 21 based on a target control value determined by the target control value determinator M5, carries out tracking control or constant speed travel control by opening or closing a throttle valve or operating a braking device, and informs the driver of the current vehicle control status by displaying it on the display 22.

Figure 8:
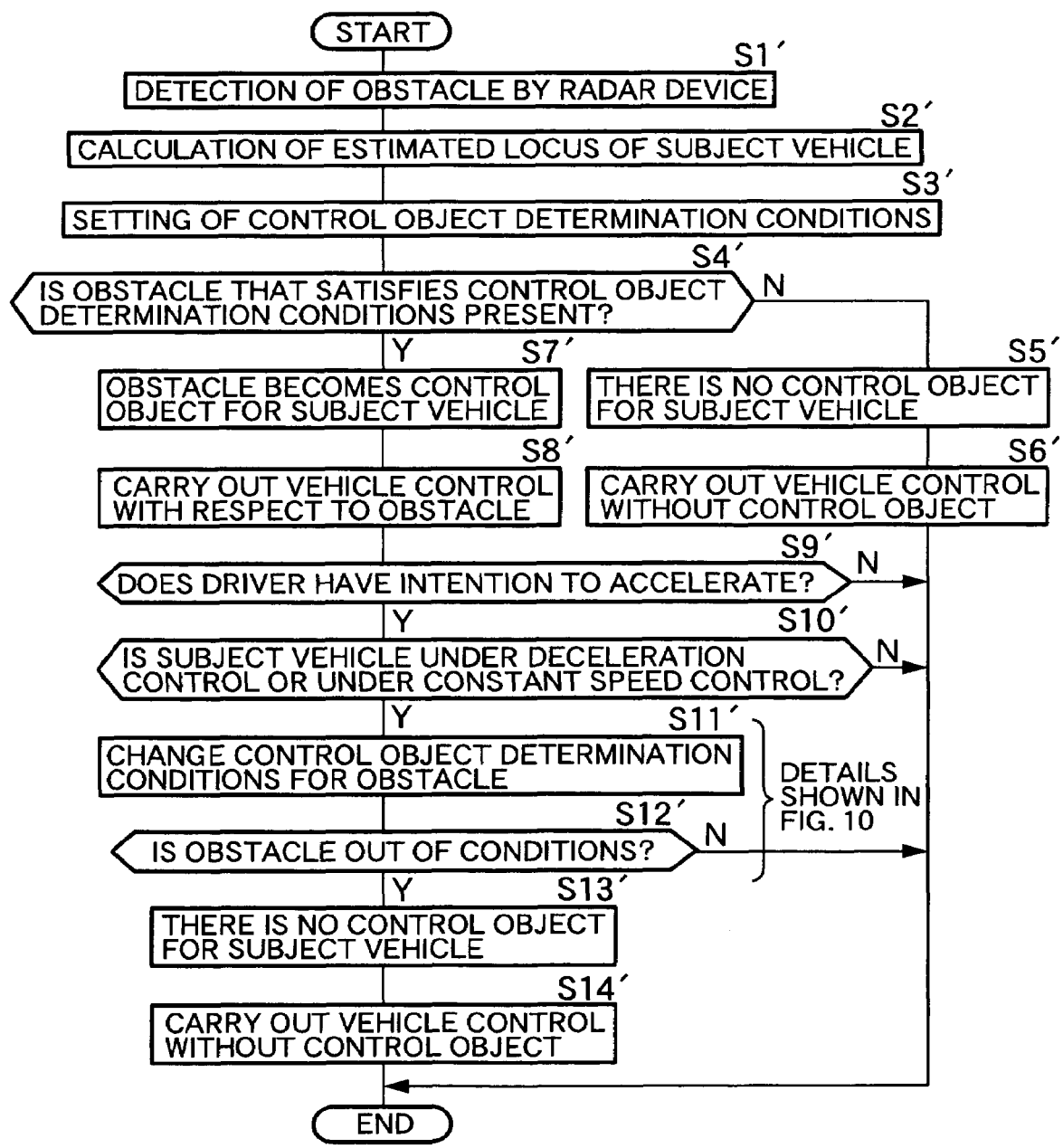
FIG. 8 is a flowchart for explaining the operation when a driver has an intention of accelerating.

The above-mentioned operation will be further described below with reference to flowcharts of FIG. 8 to FIG. 10. The flowchart of FIG. 8 illustrates a case where the acceleration/deceleration intention detector M4 detects an intention of the driver to accelerate. Firstly, in Step S1', the radar device 15 detects an object (obstacle). In Step S2', the locus estimator M1 estimates a travel locus of the subject vehicle. And, in Step S3', the control object determinator M3' sets control object determination conditions, which become criteria for determining the control object. There are three control object determination conditions. A first control object determination condition is the distance between the object detected by the radar device 15 and the travel locus of the subject vehicle estimated by the locus estimator M1 (first distance evaluation threshold value). A second control object determination condition is the distance between an estimated position after a predetermined period of time of the object detected by the radar device 15 and an estimated position of the subject vehicle after the predetermined period of time (second distance evaluation threshold value). A third control object determination condition is the lateral speed of movement of the object detected by the radar device 15 relative to the subject vehicle (speed evaluation threshold value).

In the subsequent Step S4', it is determined whether or not an object that satisfies the control object determination conditions, i.e., an object that becomes the control object, is present in the detection area set by the detection area setter M2. A requirement for an object to become the control object is that the object satisfies any one of the above-mentioned three control object determination conditions. More specifically, it is whether or not the distance between the object detected by the radar device 15 and the travel locus of the subject vehicle estimated by the locus estimator M1 is equal to or less than the first distance evaluation threshold value, whether or not the distance between an estimated position after a predetermined period of time of the object detected by the radar device 15 and an estimated position of the subject vehicle after the predetermined period of time is equal to or less than the second distance evaluation threshold value, or whether or not the lateral speed of movement of the object detected by the radar device 15 relative to the subject vehicle is equal to or less than the speed evaluation threshold value and the object is approaching the subject vehicle.

If none of the above-mentioned three control object determination conditions is satisfied, then in Step S5' it is determined that there is no control object for the subject vehicle. Then, in Step S6', vehicle control involving no control object, i.e., constant speed travel control by the ACC system, is carried out.

On the other hand, if at least one of the above-mentioned three control object determination conditions is satisfied, then in Step S7' the object becomes the control object. In Step S8', vehicle control with respect to the control object, i.e., constant inter-vehicle distance control by the ACC system, is carried out.

In the subsequent Step S9', the acceleration/deceleration intention detector M4 carries out detection of an intention of the driver to accelerate. An intention of the driver to accelerate is detected by an operation of pressing on the accelerator pedal, operation of a vehicle speed setting switch or a resume switch toward acceleration, or the voice of the driver suggesting acceleration. In this process, if in Step S10' the subject vehicle is under deceleration control or under constant speed travel control, then in Step 11' the control object determination conditions for the obstacle are changed.

These control object determination conditions are changed so that it is less easily determined that the object is the control object. If in Step S12' this change causes the object to be excluded from being a control object, then in Step S13' it is determined that there is no control object for the subject vehicle, and in Step S14' vehicle control involving no control object, i.e., constant speed travel control by the ACC system, is carried out.

Figure 9:
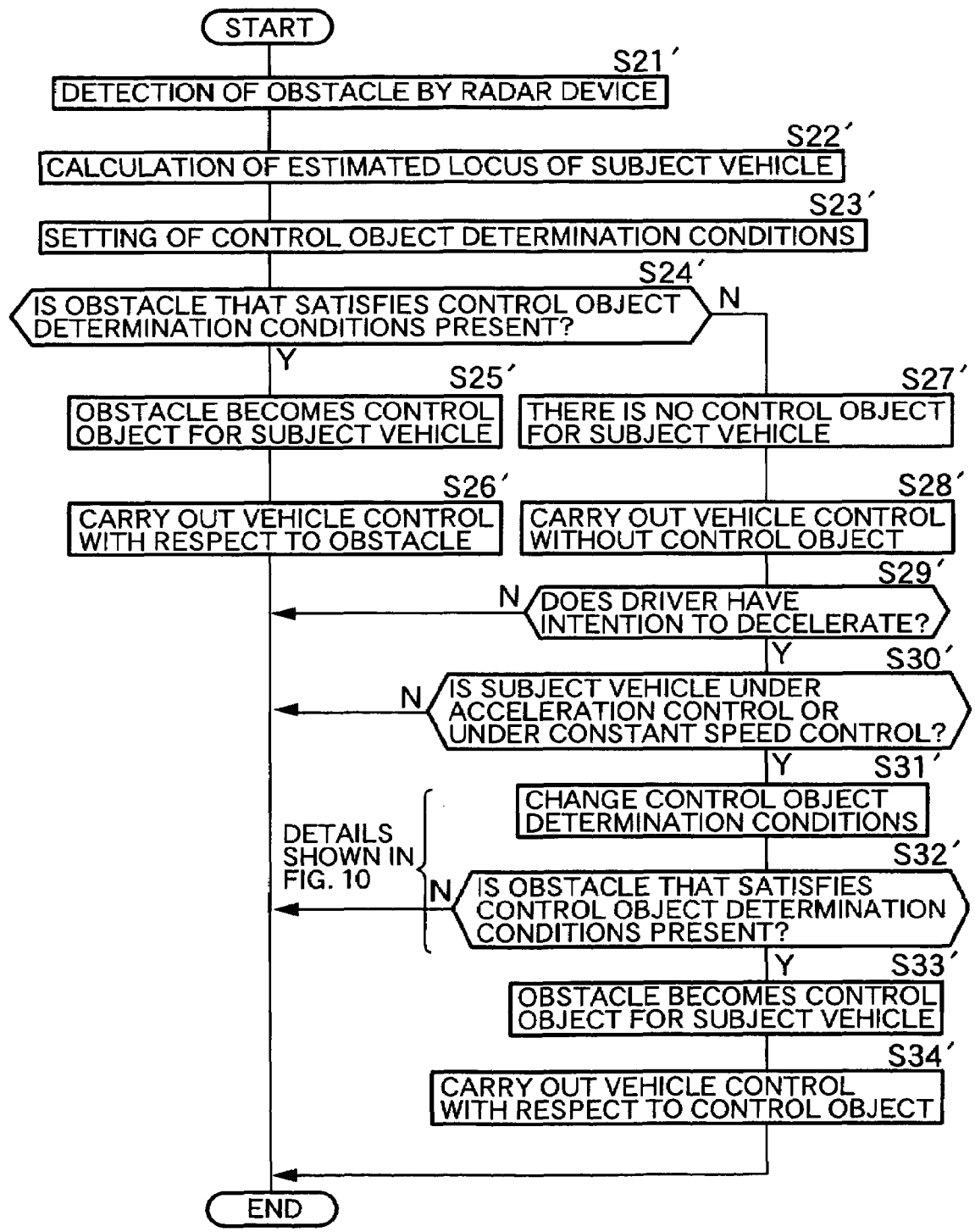
FIG. 9 is a flowchart for explaining the operation when the driver has an intention of decelerating.
Figure 10:
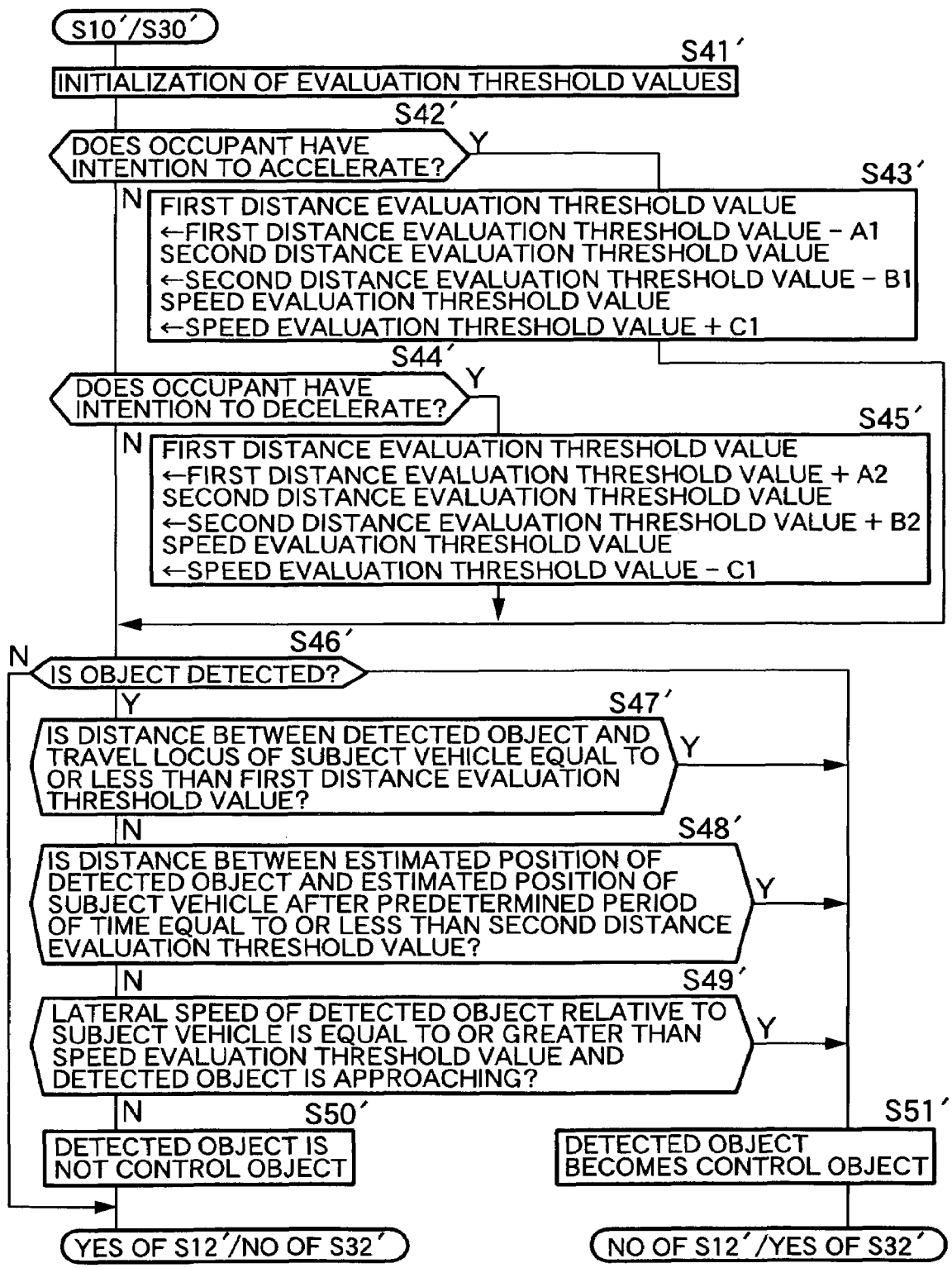
FIG. 10 is a flowchart showing a subroutine of Steps S11' and S12' of FIG. 8 or Steps S31' and S32' of FIG. 9.

The flowchart of FIG. 9 shows a case where the acceleration/deceleration intention detector M4 detects an intention of the driver to decelerate. Firstly, in Step S21', the radar device 15 detects an object (obstacle). In Step S22', the locus estimator M1 estimates a travel locus of the subject vehicle. And, in Step S23', the control object determinator M3' sets control object determination conditions, which become criteria for determining the control object. These control object determination conditions are the same as those for the above-mentioned control in the case where an intention of the driver to accelerate is detected (see the flowchart of FIG. 8).

In the subsequent Step S24', it is determined whether or not an object that satisfies the control object determination conditions, i.e., an object that becomes the control object, is present within a detection area set by the detection area setter M2. As already described for the flowchart of FIG. 8, a requirement for an object to become the control object is that the object satisfies any one of the above-mentioned three control object determination conditions. If in Step S24' there is an object that satisfies the control object determination conditions, then in Step S25' the object becomes the control object, and in Step S26' vehicle control with respect to the control object, i.e., constant inter-vehicle distance control by the ACC system, is carried out.

On the other hand, if none of the above-mentioned three control object determination conditions is satisfied, then in Step S27' it is determined that there is no control object for the subject vehicle. In Step S28', vehicle control involving no control object, i.e., constant speed travel control by the ACC system, is carried out.

In the subsequent Step S29', the acceleration/deceleration intention detector M4 carries out detection of an intention of the driver to decelerate. The intention of the driver to decelerate is detected by an operation of pressing on the brake pedal, an operation of returning the accelerator pedal, operation of the vehicle speed setting switch or the resume switch toward deceleration, or the voice of the driver suggesting deceleration. In this process, if in Step S30' the subject vehicle is under acceleration control or under constant speed travel control, then in Step S31' the control object determination conditions for the obstacle are changed.

These control object determination conditions are changed so that it is more easily determined that the object is the control object. If in Step S32' this causes the object to become the control object, then in Step S33' the object becomes the control object for the subject vehicle, and in Step S34' vehicle control with respect to the control object, i.e., constant inter-vehicle distance control by the ACC system, is carried out.

Details of Step 11' and Step S12' of the flowchart of FIG. 8 and details of Step S31' and Step S32' of the flowchart of FIG. 9 will be described below with reference to the flowchart of FIG. 10. Firstly, in Step S41', the above-mentioned three evaluation threshold values are initialized. If subsequently in Step S42' an intention of the driver to accelerate is detected, then in Step S43' the first distance evaluation threshold value is corrected so as to decrease only by A1, the second distance evaluation threshold value is corrected so as to decrease only by B1, and the speed evaluation threshold value is corrected so as to increase only by C1. On the other hand, if in Step S44' an intention of the driver to decelerate is detected, in Step S45' the first distance evaluation threshold value is corrected so as to increase only by A2, the second distance evaluation threshold value is corrected so as to increase only by B2, and the speed evaluation threshold value is corrected so as to decrease only by C2.

If in the subsequent Step S46' the radar device 15 detects an object, and in Step S47' the distance between the object and the travel locus of the subject vehicle is equal to or less than the first distance evaluation threshold value, then in Step S51' the object becomes the control object. In this process, if an intention of the driver to accelerate is detected, the first distance evaluation threshold value decreases only by A1 in Step S43', and therefore it is less easily determined that the object is the control object. Accordingly, if an intention of the driver to decelerate is detected, the first distance evaluation threshold value increases only by A2 in Step S45', and therefore it is more easily determined that the object is the control object.

If in the subsequent Step S48' the distance between the estimated position of the object and the estimated position of the subject vehicle after a predetermined period of time is equal to or less than the second distance evaluation threshold value, then in Step S51' the object becomes the control object. In this process, if an intention of the driver to accelerate is detected, the second distance evaluation threshold value decreases only by B1 in Step S43', and therefore it is less easily determined that the object is the control object. Thus, if an intention of the driver to decelerate is detected, the second distance evaluation threshold value increases only by B2 in Step S45', and therefore it is more easily determined that the object is the control object.

If in the subsequent Step S49' the lateral speed of movement of the object relative to the subject vehicle is equal to or greater than the speed evaluation threshold value, and the direction in which the object moves is a direction in which it approaches the subject vehicle, then in Step S51' the object becomes the control object. In this process, if an intention of the driver to accelerate is detected, the speed evaluation threshold value increases only by C1 in Step S43', and therefore it is less easily determined that the object is the control object. Thus, if an intention of the driver to decelerate is detected, the speed evaluation threshold value decreases only by C2 in Step S45', and therefore it is more easily determined that the object is the control object.

If none of the conditions in Steps S47', S48', and S49' holds, then in Step S50' the object does not become the control object. In this way, when the driver has a concern about the situation in front of the subject vehicle, i.e., when the driver has an intention to decelerate, the scope in which an object can become the control object is broadened, thereby carrying out more reliable vehicle control. When the driver does not have a concern about the situation in front of the subject vehicle, i.e., when the driver has an intention to accelerate, the scope in which an object can become the control object is narrowed, thereby preventing unnecessary vehicle control from being carried out. Thus, this prevents the driver from feeling uncomfortable due to an inappropriate determination of the control object, and ensures reliable operation of the ACC system. Moreover, since detection of an intention of the driver to accelerate or decelerate is carried out based on operation of the brake pedal, operation of the accelerator pedal, operation of the switch, or the voice of an occupant, the detection can be carried out easily and reliably.

Figure 11:
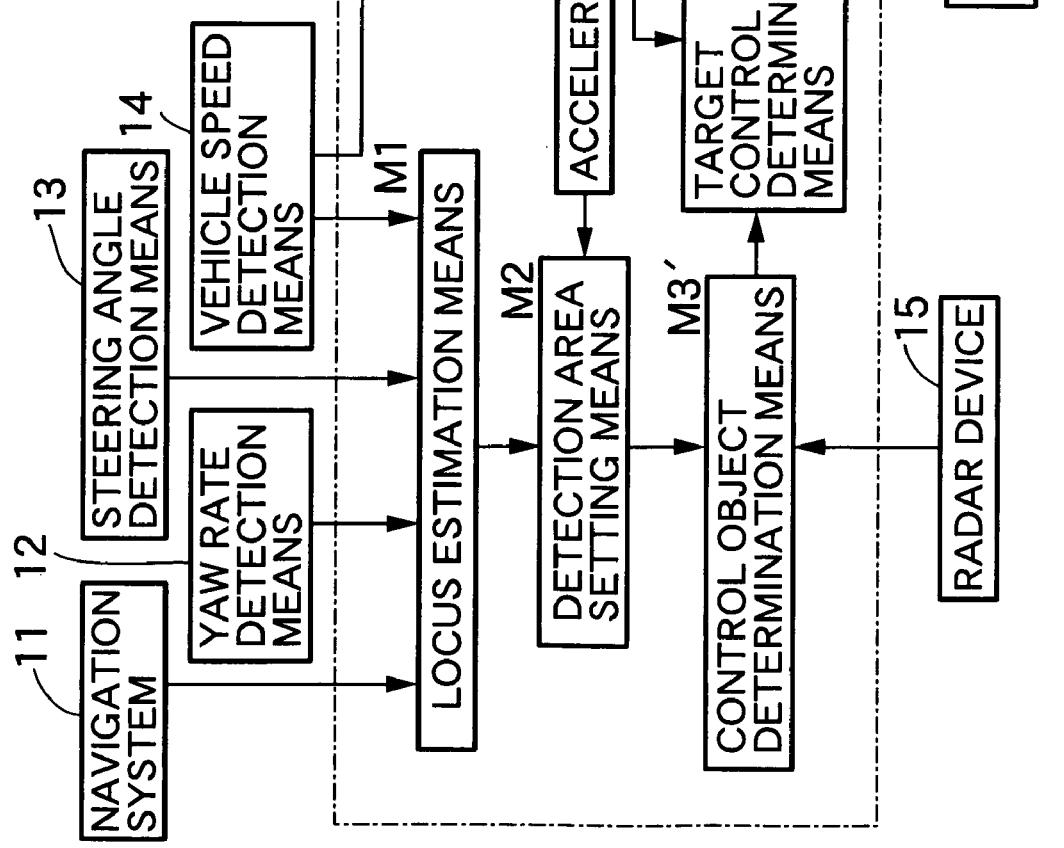
FIG. 11 is a block diagram of a control system for an ACC system according to a fourth embodiment of the present invention.

A fourth embodiment of the present invention will be described below with reference to FIG. 11. The fourth embodiment includes acceleration/deceleration detector M7 instead of the acceleration/deceleration intention detector M4 of the third embodiment, and the acceleration/deceleration detector M7 detects acceleration or deceleration by differentiating, with respect to time, a vehicle speed input from vehicle speed detector 14.

In the third embodiment, the control object determination conditions are changed based on an intention of the driver to decelerate or accelerate, but in the fourth embodiment, the control object determination conditions are changed based on an actual acceleration or deceleration of the vehicle. Since an acceleration or a deceleration of the vehicle detected by the acceleration/deceleration detector M7 not only reflects an intention of the driver to accelerate or decelerate, but also reflects automatic acceleration or deceleration by the vehicle controller M6, which does not depend on the intention of the driver, it is possible to ensure more accurate operation of the ACC system.

Although embodiments of the present invention have been explained above, the present invention can be modified in a variety of ways without departing from the subject matter of the present invention. Furthermore, in the first and second embodiments the detection area is increased generally if an intention of the driver to decelerate is detected or if deceleration of the vehicle is detected, but the detection area may be divided into a first area from the subject vehicle to the preceding vehicle and a second area from the preceding vehicle to a maximum detectable distance of the radar device 15, and at least one thereof may be increased. Which one of the first and second areas is increased can be determined according to various conditions.

For example, an area including an intersection or a fork where the probability that a cutting-in vehicle will be present is high may be preferentially increased, only the second area may be increased when the probability that another vehicle will cut in the first area is low because the inter-vehicle distance between the subject vehicle and the preceding vehicle is small, and only the first area may be increased when another vehicle can cut in the second area without danger because the inter-vehicle distance between the subject vehicle and the preceding vehicle is large.

In this way, by increasing only a part of the detection area, it is possible to prevent erroneous detection of a vehicle on the opposite lane as a preceding vehicle, or minimize the problem of the data processing load of the radar device 15 increasing.

Furthermore, the control object determination conditions of the present invention are not limited to those of the third and fourth embodiments, and may be set appropriately. Moreover, in each embodiment, the case of the ACC system has been described, but the present invention is not limited to the ACC system and applicable to a vehicular object detection system, a tracking control system, and a vehicle control system for any purpose.

What is claimed is:

1. A vehicular object detection system comprising:
    object detection means for detecting an object in front of a subject vehicle;
    locus estimation means for estimating a travel locus of the subject vehicle;
    detection area setting means for setting a predetermined detection area in front of the subject vehicle based on the travel locus of the subject vehicle;
    and obstacle extraction means for extracting an obstacle based on a detection result of the object detection means and the detection area set by the detection area setting means;
    wherein the vehicular object detection system further comprises acceleration/deceleration intention detection means for detecting an intention of an occupant to accelerate or decelerate; and
    wherein the detection area setting means changes at least a width dimension of the predetermined detection area based on a detection result of the acceleration/deceleration intention detection means.

2. The vehicular object detection system according to claim 1, wherein the detection area setting means increases the width dimension of the predetermined detection area when the acceleration/deceleration intention detection means detects an intention of the occupant to decelerate.

3. The vehicular object detection system according to claim 1, wherein the detection area setting means decreases the width dimension of the predetermined detection area when the acceleration/deceleration intention detection means detects an intention of the occupant to accelerate.

4. The vehicular object detection system according to claim 1, wherein the acceleration/deceleration intention detection means detects an intention of the occupant to accelerate or decelerate based on at least one of operation of a brake pedal by the occupant, operation of an accelerator pedal by the occupant, operation of a switch by the occupant, and voice of the occupant.

5. A vehicular object detection system comprising:
    object detection means for detecting an object in front of a subject vehicle;
    locus estimation means for estimating a travel locus of the subject vehicle;
    detection area setting means for setting a predetermined detection area in front of the subject vehicle based on the travel locus of the subject vehicle; and
    obstacle extraction means for extracting an obstacle based on a detection result of the object detection means and the detection area set by the detection area setting means;
    wherein the vehicular object detection system further comprises acceleration/deceleration detection means for detecting an acceleration or a deceleration; and
    wherein the detection area setting means changes at least a width dimension of the predetermined detection area based on a detection result of the acceleration/deceleration detection means.

6. The vehicular object detection system according to claim 5, wherein the detection area setting means increases the width dimension of the predetermined detection area when the acceleration/deceleration detection means detects a deceleration.

7. The vehicular object detection system according to claim 5, wherein the detection area setting means decreases the width dimension of the predetermined detection area when the acceleration/deceleration detection means detects an acceleration.

8. A tracking control system comprising:
   object detection means for detecting an object in front of a subject vehicle;
   locus estimation means for estimating a travel locus of the subject vehicle;
   detection area setting means for setting a predetermined detection area in front of the subject vehicle based on the travel locus of the subject vehicle;
   and obstacle extraction means for extracting an obstacle based on a detection result of the object detection means and the detection area set by the detection area setting means;
   vehicle control means for making the subject vehicle track a preceding vehicle extracted by the obstacle extraction means; and
   wherein the tracking control system further comprises acceleration/deceleration intention detection means for detecting an intention of an occupant to accelerate or decelerate; and
   wherein the detection area setting means changes at least a width dimension of the predetermined detection area based on a detection result of the acceleration/deceleration intention detection means; and
   wherein the detection area setting means changes at least one of a detection area from the subject vehicle to the preceding vehicle and a detection area from the preceding vehicle to the maximum detectable distance of the object detection means.

9. The tracking control system according to claim 8, wherein the detection area setting means is able to individually set detection areas on the left-side and right-side of the travel locus of the subject vehicle and changes, among the left-side and right-side detection areas, only the detection area that is in a direction of travel of the preceding vehicle extracted by the obstacle extraction means.

10. A vehicle control system comprising:
    object detection means for detecting an object in front of a subject vehicle;
    locus estimation means for estimating a travel locus of the subject vehicle; and
    control object determination means for determining a control object with respect to which the travel of the subject vehicle is controlled, based on outputs of the object detection means and the locus estimation means and on predetermined control object determination conditions;
    wherein the vehicle control system further comprises acceleration/deceleration intention detection means for detecting an intention of an occupant to accelerate or decelerate;
    wherein the control object determination means changes the control object determination conditions based on a detection result of the acceleration/deceleration intention detection means; and
    wherein the control object determination means changes, among the control object determination conditions, a first distance evaluation threshold value, based on a detection result of the acceleration/deceleration intention detection means, and wherein when a lateral distance between an object detected by the object detection means and a travel locus of the subject vehicle estimated by the locus estimation means is equal to or less than the first distance evaluation threshold value, the detected object becomes the control object.

11. The vehicle control system according to claim 10,
    wherein the vehicle control system further comprises target control value determination means for determining a target control value based on an output of the control object determination means, and vehicle control means for carrying out travel control of the subject vehicle based on an output of the target control value determination means, and wherein the control object determination means changes the control object determination conditions so that a detected object is more easily determined to be the control object when the acceleration/deceleration intention detection means detects an intention of the occupant to decelerate while the vehicle control means is carrying out acceleration control or constant speed travel control.

12. The vehicle control system according to claim 10,
    wherein the vehicle control system further comprises target control value determination means for determining a target control value based on an output of the control object determination means, and vehicle control means for carrying out travel control of the subject vehicle based on an output of the target control value determination means, and wherein the control object determination means changes the control object determination conditions so that a detected object is less easily determined to be the control object when the acceleration/deceleration intention detection means detects an intention of the occupant to accelerate while the vehicle control means is carrying out deceleration control or constant speed travel control.

13. The vehicle control system according to claim 10, wherein the control object determination means changes, among the control object determination conditions, a second distance evaluation threshold value, based on a detection result of the acceleration/deceleration intention detection means, and wherein when a lateral distance between an estimated position after a predetermined period of time of an object detected by the object detection means and an estimated position after the predetermined period of time of the subject vehicle is equal to or less than the second distance evaluation threshold value, the detected object becomes the control object.

14. The vehicle control system according to claim 10, wherein the control object determination means changes, among the control object determination conditions, a speed evaluation threshold value, based on a detection result of the acceleration/deceleration intention detection means, and wherein when the lateral speed of movement, relative to the subject vehicle, of an object detected by the object detection means is equal to or greater than the speed evaluation threshold value and the object is approaching the subject vehicle, the detected object becomes the control object.

15. The vehicle control system according to claim 10, wherein the acceleration/deceleration intention detection means detects an intention of the occupant to accelerate or decelerate based on at least one of operation of a brake pedal by the occupant, operation of an accelerator pedal by the occupant, operation of a switch by the occupant, and voice of the occupant.

16. A vehicle control system comprising:
object detection means for detecting an object in front of a subject vehicle;
locus estimation means for estimating a travel locus of the subject vehicle; and
control object determination means for determining a control object based on outputs of the object detection means and the locus estimation means and on predetermined control object determination conditions;
wherein the vehicle control system further comprises acceleration/deceleration detection means for detecting an acceleration or a deceleration;
wherein control object determination means changes the control object determination conditions based on a detection result of the acceleration/deceleration detection means; and
wherein the control object determination means changes, among the control object determination conditions, a first distance evaluation threshold value, based on a detection result of the acceleration/deceleration detection means, and wherein when a lateral distance between an object detected by the object detection means and a travel locus of the subject vehicle estimated by the locus estimation means is equal to or less than the first distance evaluation threshold value, the detected object becomes the control object.

17. The vehicle control system according to claim 16, wherein the vehicle control system further comprises target control value determination means for determining a target control value based on an output of the control object determination means, and vehicle control means for carrying out travel control of the subject vehicle based on an output of the target control value determination means, and wherein the control object determination means changes the control object determination conditions so that a detected object is more easily determined to be the control object when the acceleration/deceleration detection means detects a deceleration equal to or greater than a predetermined value while the vehicle control means is carrying out acceleration control or constant speed travel control.

18. The vehicle control system according to claim 16, wherein the vehicle control system further comprises target control value determination means for determining a target control value based on an output of the control object determination means, and vehicle control means for carrying out travel control of the subject vehicle based on an output of the target control value determination means, and wherein the control object determination means changes the control object determination conditions so that a detected object is less easily determined to be the control object when the acceleration/deceleration detection means detects an acceleration equal to or greater than a predetermined value while the vehicle control means is carrying out deceleration control or constant speed travel control.

19. The vehicle control system according to claim 16, wherein the control object determination means changes, among the control object determination conditions, a second distance evaluation threshold value, based on a detection result of the acceleration/deceleration detection means, and wherein when a lateral distance between an estimated position after a predetermined period of time of an object detected by the object detection means and an estimated position after the predetermined period of time of the subject vehicle is equal to or less than the second distance evaluation threshold value, the detected object becomes the control object.

20. The vehicle control system according to claim 16, wherein the control object determination means changes, among the control object determination conditions, a speed evaluation threshold value, based on a detection result of the acceleration/deceleration detection means, and wherein when the lateral speed of movement, relative to the subject vehicle, of an object detected by the object detection means is equal to or greater than the speed evaluation threshold value and the object is approaching the subject vehicle, the detected object becomes the control object.

* * * * *